United States Patent
Turbovich (10) Patent No.: US 8,292,184 B2
(45) Date of Patent: Oct. 23, 2012

(54) BARCODE SCANNER (76) Inventor: Irit Turbovich, Haifa (IL)

(*) Notice: Subject to any disclaimer, the term of this patent is extended or adjusted under 35 U.S.C. 154(b) by 0 days.

(21) Appl. No.: 13/297,358

(22) Filed: Nov. 16, 2011

(65) Prior Publication Data

US 2012/0223143 A1  Sep. 6, 2012

Related U.S. Application Data (60) Provisional application No. 61/448,685, filed on Mar. 3, 2011.

(51) Int. Cl.
*G06K 7/10* (2006.01)
(52) U.S. Cl. .............. 235/472.02; 235/462.45
(58) Field of Classification Search .......... 235/462.44, 235/462.45, 462.46, 472.01, 472.02, 472.03
See application file for complete search history.

(56) References Cited

U.S. PATENT DOCUMENTS

| | | | | |
|---|---|---|---|---|
| 4,766,299 A | * | 8/1988 | Tierney et al. | 235/462.21 |
| 5,191,197 A | * | 3/1993 | Metlitsky et al. | 235/462.44 |
| 5,250,790 A | * | 10/1993 | Melitsky et al. | 235/462.44 |
| 5,272,324 A | * | 12/1993 | Blevins | 235/462.44 |
| 5,340,972 A | * | 8/1994 | Sandor | 235/462.44 |
| 5,514,861 A | * | 5/1996 | Swartz et al. | 235/462.44 |
| 5,543,610 A | * | 8/1996 | Bard et al. | 235/462.44 |
| 5,744,788 A | * | 4/1998 | Metlitsky et al. | 235/454 |
| 5,969,327 A | * | 10/1999 | Metlitsky et al. | 235/472.01 |

* cited by examiner

*Primary Examiner* — Karl D Frech (57) ABSTRACT

A wireless product code reader comprises a scanner for scanning product codes; processing electronics for providing a raw signal proportional to signal intensities detected while scanning the product code; a wireless interface for providing said raw signals to a receiving unit; and a mounting unit for mounting said barcode reader on the body of a user for hands free use. The scanner may be an optical scanner for scanning barcodes.

24 Claims, 6 Drawing Sheets

BARCODE SCANNER

RELATED APPLICATION

This application claims the benefit of priority under 35 USC 119(e) of U.S. Provisional Patent Application No. 61/448,685 filed Mar. 3, 2011, the contents of which are incorporated herein by reference in their entirety.

FIELD AND BACKGROUND OF THE INVENTION

The present invention relates to a device and method for scanning of barcodes.

Present day barcode scanning is ubiquitous for stock control, and is used in shops and supermarkets, as well as in warehouses and in offices.

To quote from Wikipedia, a barcode reader (or barcode scanner) is an electronic device for reading printed barcodes. Like a flatbed scanner, it consists of a light source, a lens and a light sensor translating optical impulses into electrical ones. Additionally, nearly all barcode readers contain decoder circuitry analyzing the barcode's image data provided by the sensor and sending the barcode's content to the scanner's output port.

Barcode scanners may include laser scanners, for example solid state or semiconductor lasers including diode lasers. Alternative scanners may include CCD scanners. As a further alternative, cameras, such as mobile telephone cameras, are able to read barcodes when provided with suitable software.

Scanning methods are distinguished by the amount of operator manipulation required. Thus pen or wand-type readers require the operator to swipe the pen over the code. Semi-automatic handheld readers do not require the operator to swipe, but they must at least position the reader near the label. Fix-mount readers for automatic reading work by laterally passing the label over the reader. No operator is required, but the position of the code target must coincide with the imaging capability of the reader. Using reader gates for automatic scanning, the position of the code must be just under the gate for short time, enabling the scanner sweep to capture the code target successfully.

Pen-type readers consist of a light source and a photodiode that are placed next to each other in the tip of a pen or wand. To read a bar code, the tip of the pen moves across the bars in a steady motion. The photodiode measures the intensity of the light reflected back from the light source and generates a waveform that is used to measure the widths of the bars and spaces in the bar code. Dark bars in the bar code absorb light and white spaces reflect light so that the voltage waveform generated by the photo diode is a representation of the bar and space pattern in the bar code. The waveform is decoded by the scanner in a manner similar to the way Morse code dots and dashes are decoded.

Other types of wand are known that do not require contact with the barcode.

Laser scanners work the same way as pen type readers except that they use a laser beam as the light source and typically employ either a reciprocating mirror or a rotating prism to scan the laser beam back and forth across the bar code. As with the pen type reader, a photodiode is used to measure the intensity of the light reflected back from the bar code. In both pen readers and laser scanners, the light emitted by the reader is rapidly varied in brightness with a data pattern and the photodiode receive circuitry is designed to detect only signals with the same modulated pattern.

CCD readers use an array of hundreds of tiny light sensors lined up in a row in the head of the reader. CCD readers may have difficulty reading poorly presented barcodes, say barcodes at awkward angles or slightly damaged or covered in dirt.

Omni-directional scanners almost all use a laser. Unlike the simpler single-line laser scanners, they produce a pattern of beams in varying orientations allowing them to read barcodes presented at different angles. Most of them use a single rotating polygonal mirror and an arrangement of several fixed mirrors to generate their complex scan patterns. Omni-directional scanners are most familiar through the scanners with two scanning windows that are widely used in supermarkets, where packages are slid across a glass or sapphire window. There are a range of different omni-directional units available which can be used for differing scanning applications, ranging from retail type applications with the barcodes read only a few centimeters away from the scanner to industrial conveyor scanning where the unit can be a couple of meters away or more from the code. Omni-directional scanners are also better at reading poorly printed, wrinkled, or even torn barcodes. Regular laser barcode readers may also include design features to allow reading of awkwardly presented barcodes.

While cell phone cameras without auto-focus are not ideal for reading some common barcode formats, there are 2D barcodes (such as Semacode) which are optimized for cell phones, as well as QR Codes and Data Matrix codes which can be read quickly and accurately with or without auto-focus.

The reader packaging can be distinguished as follows:

The handheld scanner with a handle and typically a trigger button for switching on the light source.

Pen scanner (or wand scanner) a pen-shaped scanner that is swiped.

A stationary scanner is a wall- or table-mounted scanner under or beside which the barcode is passed. These are commonly found at the checkout counters of supermarkets and other retailers.

A fixed-position scanner is an industrial barcode reader used to identify products during manufacture or logistics. Such is often used on conveyor tracks to identify cartons or pallets which need to be routed to another process or shipping location. Another application joins holographic (or barcode) scanners with a checkweigher to read bar codes of any orientation or placement, and weighs the package. Systems like this are used in factory and farm automation for quality management and shipping.

A PDA scanner (or Auto-ID PDA) is a PDA with a built-in barcode reader or attached barcode scanner.

An automatic reader is back office equipment to read barcoded documents at high speed (50,000/hour).

A cordless scanner (or Wireless scanner) is a cordless barcode scanner operated by a battery fitted inside it and is not connected to the electricity mains.

Methods of Connection

Early Serial Interfaces

Early barcode scanners, of all formats, almost universally used the then-common RS232 serial interface. This was an electrically simple means of connection and the software to access it is also relatively simple, although needing to be written for specific computers and their serial ports. There are a few less common proprietary interfaces as well With the popularity of the PC and its standard keyboard interface, it became ever easier to connect physical hardware to a PC and so there was commercial demand similarly to reduce the complexity of the associated software. "Keyboard wedge" hardware plugged between the PC and its normal keyboard, allowed characters from the barcode scanner to appear exactly as if they had been typed at the keyboard. This made the addition of simple barcode reading abilities to existing programs very easy, without any need to change them, although it did require some care by the user and could be restrictive in the content of the barcodes that could be handled.

USB

Later barcode readers began to use USB connectors rather than the keyboard port, as this became a more convenient hardware option. To retain the easy integration with existing programs, a device driver called a "software wedge" could be used, to emulate the keyboard-impersonating behaviour of the old keyboard wedge hardware.

In many cases a choice of USB interface types (HID, CDC) are provided. Some have Powered USB.

Wireless Networking

Modern handheld barcode readers are operated in wireless networks according to IEEE 802.11g (WLAN) or IEEE 802.15.3 (Bluetooth). However, such a configuration limits the time of operation from a battery or rechargeable battery and requires recharging at least after a shift of operation.

Resolution

The scanner resolution is measured by the size of the dot of light emitted by the reader. If the dot of light is wider than any bar or space in the bar code, then it will overlap two elements (two spaces or two bars) and it may produce a wrong output. On the other hand, if a too small dot of light is used, then it can misinterpret any spot on the bar code making the final output wrong.

The most commonly used dimension is 13 mils (0.33 mm), although some scanners can read codes with dimensions as small as 3 mils (0.076 mm). Smaller bar codes are printed at high resolution to be read accurately.

In general, stationary scanners are used in point of sale systems. These have the advantage of being best able to read unclear or not well attached bar codes, and leave the operator's hands free to handle goods. On the other hand stationary scanners are expensive and take up large amounts of space. Handheld scanners do not take up space but interfere with the ability of the operator to handle the goods that are being scanned.

SUMMARY OF THE INVENTION

According to one aspect of the present invention there is provided a wireless reader for labels comprising:
a scanner for scanning the labels for codes;
processing electronics for providing a raw signal proportional to signal intensities detected while scanning the product code;
a wireless interface for providing the raw signals to a receiving unit; and
a mounting unit for mounting the reader on a user to permit hands-free use by the user.

In an embodiment, the scanner is an optical scanner and the codes to be scanned comprise barcodes.

In an embodiment, the scanner is an RFID scanner and the codes are comprised in RFIDs, or wherein the scanner is a holographic scanner and the codes are comprised in holograms.

In an embodiment, the mounting unit comprises a wrist band.

In an embodiment, the mounting unit is configured such that the reader extends forward of the wrist onto the back of the hand.

In an embodiment, the mounting unit comprises a front band to extend across the palm of the hand behind the fingers and a wristband to extend across the wrist behind the base of the thumb.

An embodiment may further comprise a movement based generator.

An embodiment may comprise a flexible layer on a mounting surface of the reader.

An embodiment may comprise a window over the scanner, and further comprising a protective frame extending around the window.

In an embodiment, the scanner comprises an omni-directional scanner, or a single laser scanner or a charge coupled device or a hologram scanner.

In an embodiment, the omni-directional scanner provides a scan pattern of beams at a plurality of orientations, thereby to read barcodes at different angles.

An embodiment may comprise a single rotating polygonal mirror and an arrangement of several fixed mirrors to generate the scan pattern.

According to a second aspect of the present invention there is provided a method of scanning codes on labels comprising:
providing to a user a barcode reader for mounting on the back of a hand, the reader comprising a scanner;
detecting at the scanner, a variation in intensities as the scanner is scanned over a barcode;
transmitting the intensities wirelessly to a receiver.

An embodiment may comprise mounting the reader using a wrist band.

An embodiment may comprise mounting the reader on the back of the hand such that the reader extends forward of the wrist onto the back of the hand.

An embodiment may comprise mounting the reader using a front band to extend across the palm of the hand behind the fingers and a wristband to extend across the wrist behind the base of the thumb.

An embodiment may comprise charging the reader using at least one member of the group comprising a movement based generator, and a solar panel.

An embodiment may comprise scanning using an omni-directional scanner.

An embodiment may comprise using the omni-directional scanner to provide a scan pattern of beams at a plurality of orientations, thereby to read barcodes at different angles.

An embodiment may comprise rotating a single polygonal mirror to provide a beam successively to different ones of several fixed mirrors to generate the scan pattern.

According to a third aspect of the present invention there is provided a system for barcode reading comprising:
a) a wireless barcode reader, the reader comprising:
   a scanner for scanning product codes;
   processing electronics for providing a raw signal proportional to signal intensities detected while scanning the barcode;
   a wireless interface for providing the raw signals to a receiving unit; and
   a mounting unit for mounting the barcode reader on a back of a hand; and
b) a receiving unit configured for translating the raw signal into recognized characters and products.

According to a fourth aspect of the present invention there is provided a wireless handheld product code reader comprising:
a scanner for scanning codes;
processing electronics for providing a raw signal proportional to signal intensities detected while scanning the code; and an interface for providing the raw signals to a receiving unit.

An embodiment may comprise a handle, to allow handheld use, and/or a mounting unit for mounting the unit on the body of a user to provide hands free use.

In an embodiment, the interface comprises a wireless interface.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present embodiments comprise a wireless product scanner that optically scans a labeled object for a code and obtains intensity variations from the scan. The scanner transmits the results of the scan as a raw signal to a receiving device. The receiving device decodes the received intensities and translates them into object or product codes.

The scanner may be body mounted on the operator to leave the hands free to handle objects or goods being scanned or dealing with other tasks or for any other reason or need. To date, handheld scanners have not been used in situations where handling of the goods is required simultaneously with scanning. The removal of all the decoding functions to a receiving device allows the scanner of the present embodiments to be smaller and lighter and thus more suitable for body mounting.

As will be discussed below, the types of scanners that may be used include a pen scanner, a stationary scanner, fixed-position scanners, automatic readers, cordless scanners, handheld scanners, body/hand mounted scanner for hands-free use, beltweighers which include scanning, in-motion scales which include scanning, dynamic scales and the like.

Devices in which the receiving unit is also a small portable computing device such as a personal digital assistant PDA, may be used.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
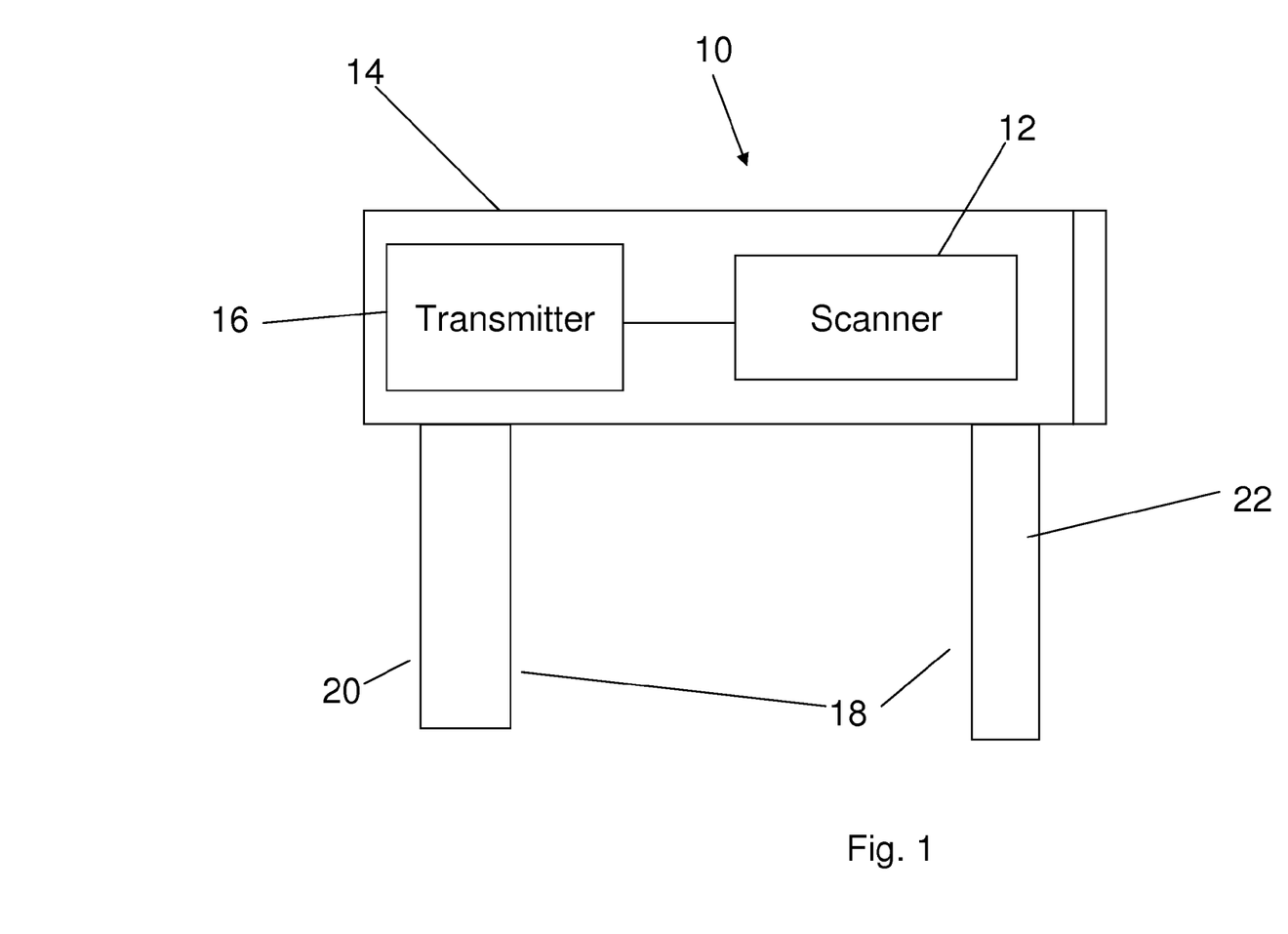
FIG. 1 is a simplified block diagram illustrating a first reader device according to the present embodiments.

Reference is now made to FIG. 1 which illustrates a wireless barcode reader 10 that includes a scanner 12 for scanning objects codes located within a housing 14.

The housing preferably has rounded edges, so as to avoid causing injury. The housing is preferably made from light but strong material.

Processing electronics, in or associated with the scanner, provides a raw signal proportional to signal intensities detected while scanning the object code. No attempt to decode the signal as such is made within the reader. Rather the raw signal is sent to a wireless interface 16 which transmits the raw signal to a receiving unit, not shown. A mounting unit 18 allows the reader to be mounted on the body of the operator to provide hands free use. The most convenient position on the body for such hands free use is on the back of the hand, and the mounting unit 18 may for example comprise an attachment unit such as a bracelet. Alternatively a pair of straps 20 and 22 may be provided as an attachment unit. The mounting unit is thus made up of the base of the housing and the attachment unit and allows the reader to be mounted on the back of the hand of an operator, leaving the hand itself free to handle goods and allowing the operator to scan the product with a simple hand movement.

The device is preferably as light as possible and thus all functionality except for the bare minimum including the scanning and transmission, is passed to the receiving device, which may be built into a point of sale computer or the like/or any computer chosen.

The scanner is typically an optical scanner for scanning barcodes. The scanner may include a laser scanner, for example a solid state or a semiconductor laser including a diode laser. The scanner may be a CCD Likewise the product codes comprise barcodes.

However the scanner may also be an RFID scanner. The product codes are included in RFIDs. RFIDs tend to be used for higher value goods and in warehouses. RFID scanners scan electronically over a range of frequencies rather than optically over a length, but otherwise the principle is the same and a product code is obtained.

Scanners may include a holographic scanner. Holographic scanners come under two headings, a data scanner and a chemical scanner.

Regarding data, Holographic data storage is a technique that can store information at high density inside crystals or photopolymers. Many current optical storage techniques such as Blu-ray Disc are reaching the limit of possible data density due to the diffraction-limited size of the writing beams, and holographic storage has no such limits. The advantage of holographic data storage is that the volume of the recording media is used instead of just the surface. Currently available holographic data storage systems can produce about 1000 different images a second at 1024×1024-bit resolution. With the right type of media—perhaps polymers rather than currently used $LiNbO_3$—this would result in about 1 gigabit per second writing speed. Read speeds can surpass this and experts believe 1-terabit per second readout is possible. While many holographic data storage models have used page-based storage, where each recorded hologram holds a large amount of data, more recent research into using submicrometer-sized microholograms has resulted in several potential 3D optical data storage solutions. While this approach to data storage cannot attain the high data rates of page-based storage, the tolerances, technological hurdles, and cost of producing a commercial product are significantly lower.

A chemical holographic scanner is a sensor that comprises a hologram embedded in a smart material that detects certain molecules or metabolites. This detection is usually a chemical interaction that is transduced as a change in one of the properties of the holographic reflection (as in the Bragg reflector), either refractive index or spacing between the holographic fringes. The specificity of the sensor can be controlled by adding molecules in the polymer film that selectively interact with the molecules of interest.

A holographic sensor aims to integrate the sensor component, the transducer and the display in one device for fast reading of molecular concentrations based in colorful reflections or wavelengths.

Certain molecules that mimic biomolecule active sites or binding sites can be incorporated into the polymer that forms the holographic film in order to make the holographic sensors selective and/or sensitive to certain medical important molecules like glucose, etc.

The holographic sensors can be read from a fair distance because the transducer element is light that has been refracted and reflected by the holographic grating embedded in the sensor. Therefore they can be used in industrial applications where non-contact with the sensor is required.

In addition to scanning as such, standard imaging can be applied, say via a camera, and computer vision used to interpret the label. Alternatively, computer vision could be used to visually identify the object as such, without the help of any machine readable label.

Figure 2:
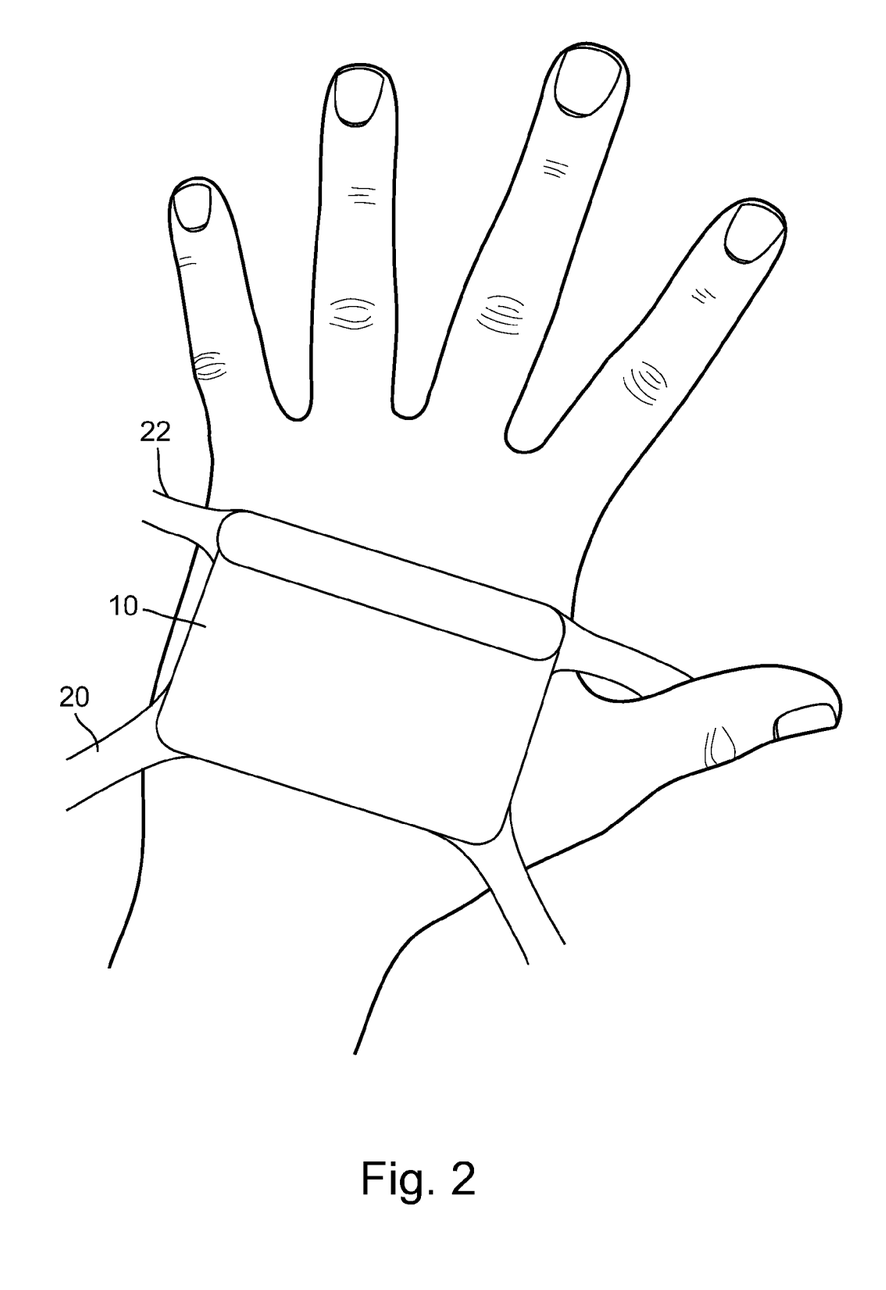
FIG. 2 shows a reader according to FIG. 1, mounted on a hand, and seen from above.

Reference is now made to FIG. 2 which is a simplified diagram illustrating the reader 10 seen from above and mounted on a hand. The mounting unit may comprise two halves of a wrist band 20 which are tied or strapped on the wrist.

Mounting may be arranged so that the reader body extends forward of the wrist onto the back of the hand. An additional pair of straps 22 may be placed at the front of the housing, to pass between the fingers in front of the thumb. The straps are intended for ease of mounting and removal and give the operator full freedom of hand movement.

Typically the wrist straps may extend perpendicularly from the housing. All the straps may be angled as needed.

Figure 3A:
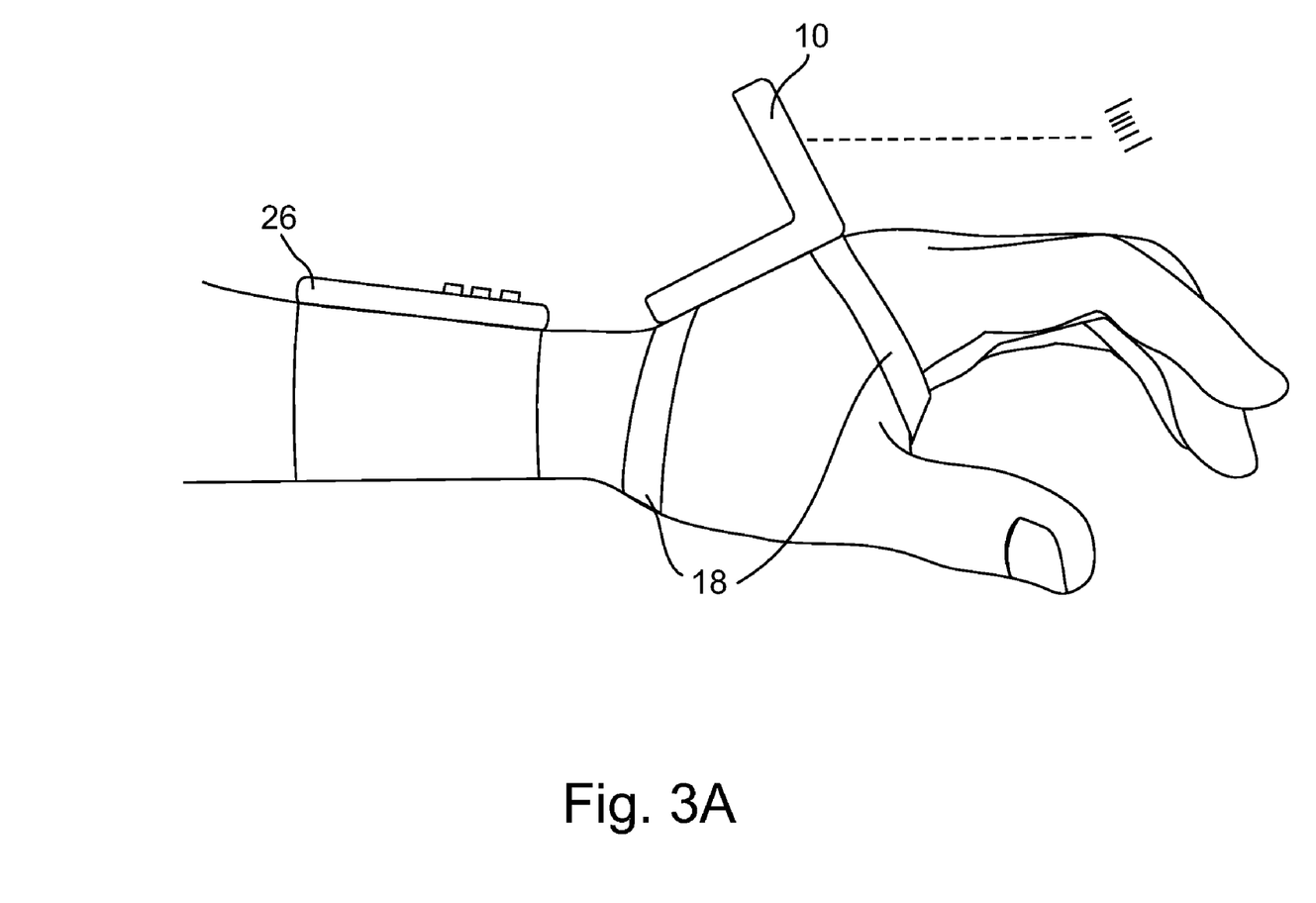
FIGS. 3A and 3B illustrate two alternatives of the device of FIG. 1, mounted on a hand and seen from the side.
Figures 3B, 4:
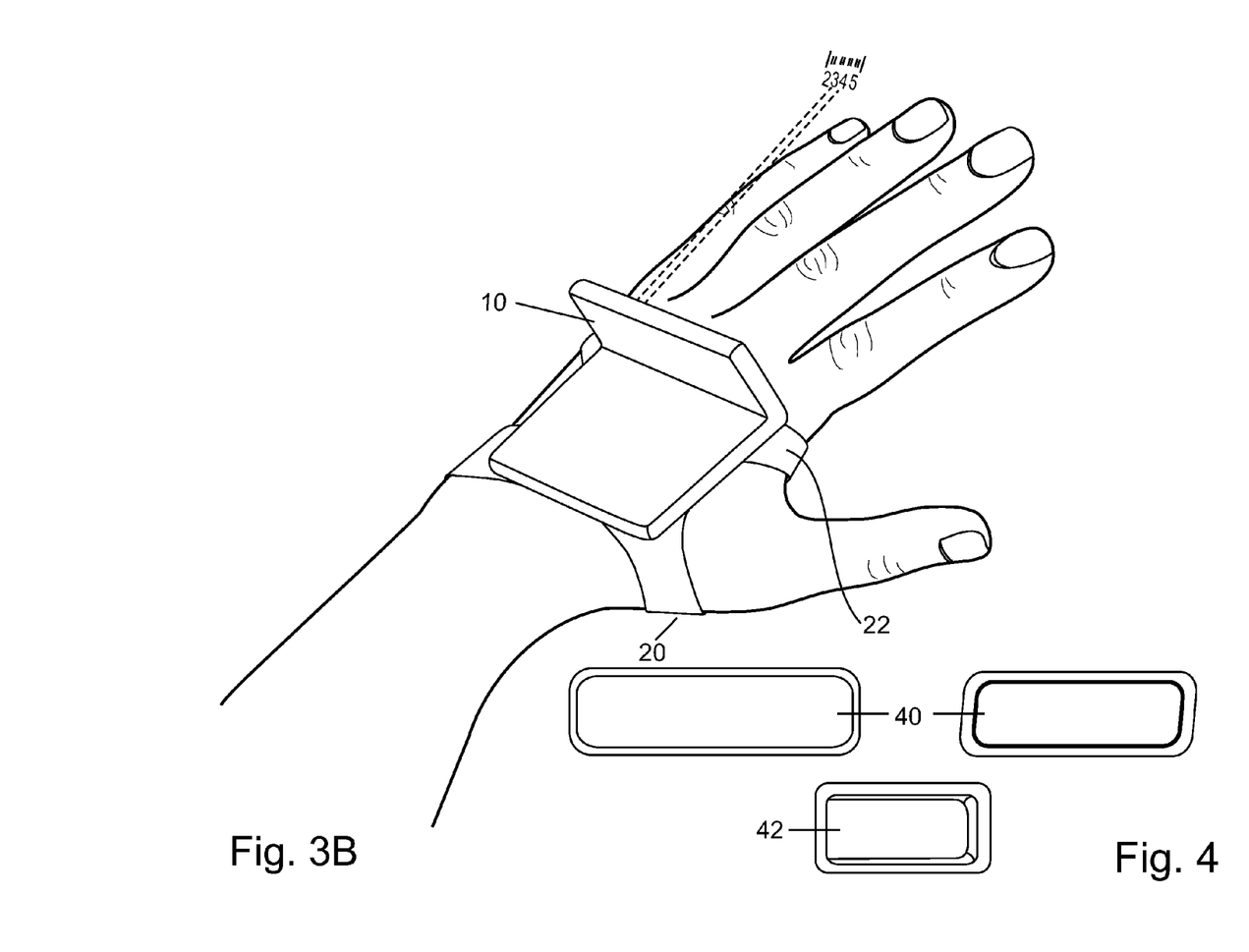
FIG. 4 illustrates scanning windows and frames for an optical scanner device according to the present embodiments.

Reference is additionally made to FIGS. 3A and 3B, which are side views of the mounting unit. In FIG. 3A the reader 10 is mounted on the back of the hand. The reader is attached to the hand by attachment unit 18 which may be a strap. A strap or bracelet 26 may support a small PDA or other device or may include buttons for control functions on the reader. In FIG. 3B the barcode reader 10 is again held on the back of the hand. In FIG. 3B it is attached via rear strap 20 and front strap 22.

It is noted that the reader may be symmetrical so as to be equally suitable for left and right hand use.

In order to reduce the amount of recharging needed, a small movement based power generator may be used. Piezoelectric elements or other inertia based systems may be used. Likewise, other forms of energy, say those based on characteristics or conditions of the hand or other relevant body parts such as thermo-electric energy may be used. Alternatively, a solar panel may be used, or any other form of alternative energy that may be suitable. In general the scanner may be designed to use sources of energy available at the point of use. The scanner may be operated by one source of energy or more than one, simultaneously or not. The size of the battery and the frequency of recharging are thus reduced and the reader is more environmentally friendly.

Different energy sources may be used to back up each other.

It is noted that since most of the electronic processing is moved to the receiving device, less power is used than in a conventional barcode reader.

In an embodiment, a flexible layer, such as a rubber or fiber substance may be coated on the mounting surface of the reader against the skin to reduce friction or pressure or otherwise make the device more comfortable. Rubber or synthetic rubbers are preferred since there may be several operators of the same device over the course of the day and it is preferable for hygiene purposes to have something that can easily be wiped clean. Preferably one or more materials on the reader may have antibacterial or/and antifungal properties.

A window may be located over the scanner. A protective frame may extend around the window to provide mechanical protection. Referring to FIG. 4, a window 40 is protected by a frame 42. The beam is projected sufficiently high above the fingers to avoid the fingers interfering with the beam.

The reader preferably has a waterproof housing to avoid being damaged say by leaky goods.

In addition to being waterproof, the housing may also include shielding, as the reader is designed to be worn on the body for long periods of time so that even low levels of electromagnetic radiation could be problematic.

The scanner may be a pencil scanner, producing a single beam that is physically scanned over the barcode by the movement of the hand until the barcode is registered. The receiving device may provide an indication signal, such as an audible beep, every time a product code has been successfully recognized.

Figure 5:
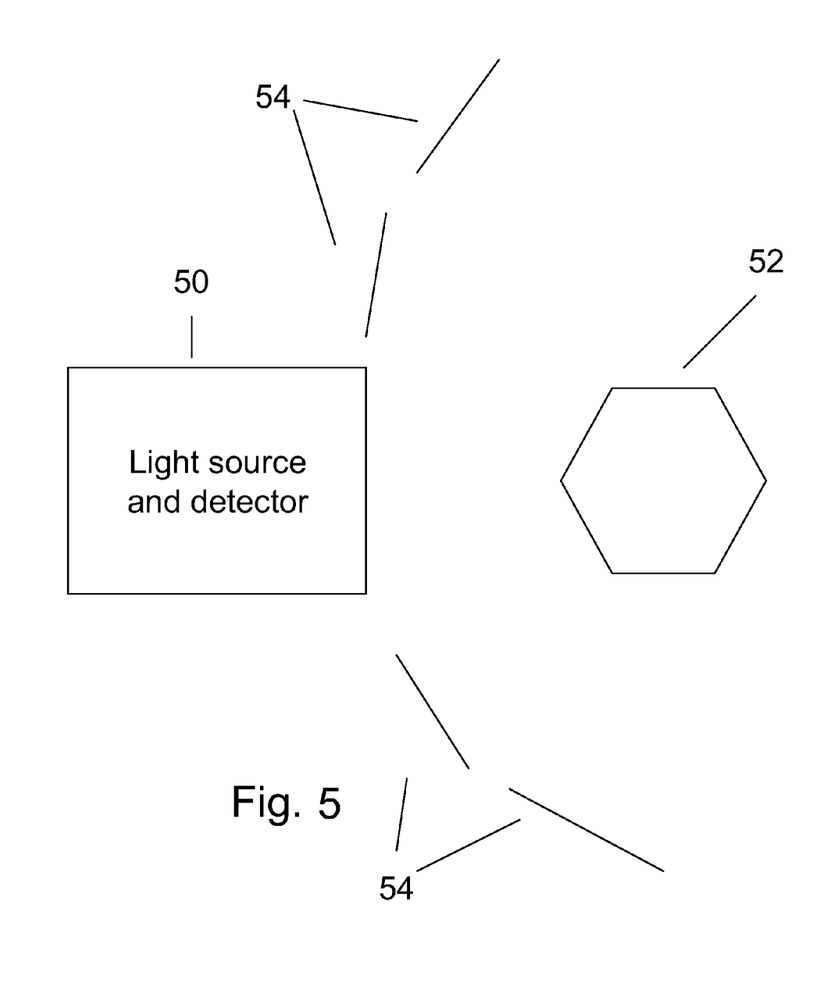
FIG. 5 is a simplified schematic diagram showing an omni-directional optical scanner for use with the present embodiments.

Reference is now made to FIG. 5, which illustrates an alternative scanner that is able to provide a beam that scans at several angles so that a bar code can be found even if not precisely located in front of the scanner.

A light source 50 provides a beam towards a polygonal mirror 52 which rotates. As the mirror rotates it passes the beam in turn to different flat mirrors 54 placed within the housing, each angled differently.

The beam is reflected by each of the mirrors in turn and if a barcode is met by the beam then a reflection is received which returns via the polygonal mirror to a detector alongside the light source. Peaks and troughs of the light indicated the white and black bands of the barcode and provide the raw signal.

Such a scanner is an omni-directional scanner. The omni-directional scanner provides a scan pattern of beams at a plurality of orientations as described, so as to read barcodes at different angles.

A scanner may provide a single beam,—single line laser scanner—or multiple beams—an omni-directional scanner—in a scan pattern.

Figure 6:
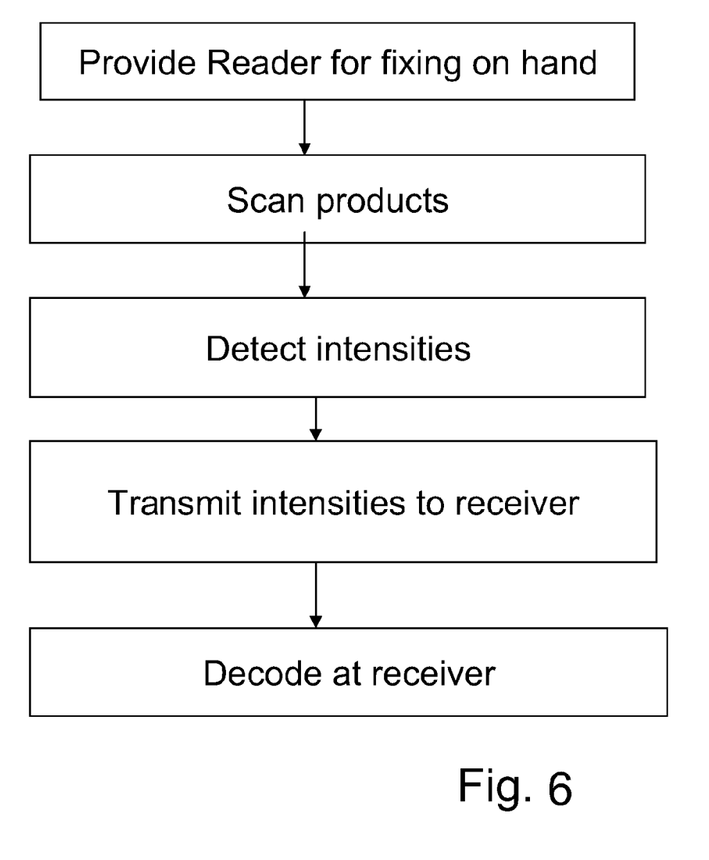
FIG. 6 is a simplified flow chart illustrating use of the present embodiments.

Reference is now made to FIG. 6 which illustrates a method of using the scanner. In use an operator is provided with a barcode reader for mounting on the back of a hand. As discussed, the reader may comprise an optical scanner or a laser scanner or an RFID reader or a holographic scanner or others. The scanner is mounted on the back of the hand and waved in front of the product carrying the RFID or barcode or holograph or other. A variation in intensities is detected as the scanner is scanned over the barcode or RFID label or holograph etc.

The intensities are transmitted wirelessly to a receiver where they are decoded.

A system for barcode reading comprises the wireless barcode reader as discussed together with a receiving unit that translates the raw signal into recognized characters and products.

The data that is read at the receiving unit may be decoded immediately, or partially decoded immediately. The decoded or undecoded information may be stored for later use.

Scanning may be carried out in the point of sale environment, in the warehousing or storage environment and other environments as well. More than one sensor or more than one kind of sensor may be provided on a scanner.

Use of the reader may be together with a glove. The glove may be specific for use with the reader, or may be a standard glove onto which the reader is fitted as required. The reader may be mounted on the glove.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims, including developments in scanning and object or product labeling technology or object or product identification and the like. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A wireless reader for labels comprising:
a scanner for scanning said labels for codes;
processing electronics for providing a raw signal proportional to signal intensities detected while scanning the product code;
a wireless interface for providing said raw signals being proportional to said signal intensities to a central receiving unit, said central receiving unit being associated with multiple users or multiple devices; and
a mounting unit for mounting said wireless reader on a user to permit hands-free use by said user, thereby to provide wireless transmission of raw signals proportional to signal intensities detected while scanning a product code from a user to said central receiving unit.

2. The reader of claim 1, wherein said scanner is an optical scanner and said codes to be scanned comprise barcodes.

3. The reader of claim 1, wherein said scanner is an RFID scanner and said codes are comprised in RFIDs, or wherein said scanner is a holographic scanner and said codes are comprised in holograms.

4. The reader of claim 1, wherein said mounting unit comprises a wrist band.

5. The reader of claim 4, wherein the mounting unit is configured such that the reader extends forward of the wrist onto the back of the hand.

6. The reader of claim 1, wherein said mounting unit comprises a front band to extend across the palm of the hand behind the fingers and a wristband to extend across the wrist behind the base of the thumb.

7. The reader of claim 1, further comprising a movement based generator.

8. The reader of claim 1, further comprising a flexible layer on a mounting surface of said reader.

9. The reader of claim 1, comprising a window over the scanner, and further comprising a protective frame extending around the window.

10. The reader of claim 1, wherein the scanner comprises an omni-directional scanner, or a single laser scanner or a charge coupled device or a hologram scanner.

11. The reader of claim 10, wherein said omni-directional scanner provides a scan pattern of beams at a plurality of orientations, thereby to read barcodes at different angles.

12. The reader of claim 11, comprising a single rotating polygonal mirror and an arrangement of several fixed mirrors to generate said scan pattern.

13. A method of scanning codes on labels comprising:
providing to a user a barcode reader for mounting on the back of a hand, the reader comprising a scanner;
detecting at said scanner, a variation in intensities as said scanner is scanned over a barcode;
transmitting said intensities detected during scanning wirelessly to a central receiving unit associated with multiple users or multiple devices, thereby to provide wireless transmission of raw signals proportional to signal intensities detected while scanning a product code from a user to said central receiving unit.

14. The method of claim 13, further comprising mounting said reader using a wrist band.

15. The method of claim 13, comprising mounting said reader on the back of the hand such that the reader extends forward of the wrist onto the back of the hand.

16. The method of claim 13, comprising mounting said reader using a front band to extend across the palm of the hand behind the fingers and a wristband to extend across the wrist behind the base of the thumb.

17. The method of claim 13, comprising charging said reader using at least one member of the group comprising a movement based generator, and a solar panel.

18. The method of claim 13, comprising scanning using an omni-directional scanner.

19. The method of claim 18, comprising using said omni-directional scanner to provide a scan pattern of beams at a plurality of orientations, thereby to read barcodes at different angles.

20. The method of claim 19, further comprising rotating a single polygonal mirror to provide a beam successively to different ones of several fixed minors to generate said scan pattern.

21. A system for barcode reading comprising:
a) a wireless barcode reader, the reader comprising:
  a scanner for scanning product codes;
  processing electronics for providing a raw signal proportional to signal intensities detected while scanning the barcode;
  a wireless interface for providing said raw signals to a receiving unit; and
  a mounting unit for mounting said barcode reader on a back of a hand; and
b) a central receiving unit associated with a plurality of users or a plurality of devices, and configured for translating said raw signal into recognized characters and products, thereby to provide wireless transmission of raw signals proportional to signal intensities detected while scanning a product code from a user to said central receiving unit.

22. A wireless handheld product code reader comprising:
a scanner for scanning codes;
processing electronics for providing a raw signal proportional to signal intensities detected while scanning the code; and
an interface for providing said raw signals to an external receiving unit associated with multiple users or multiple devices, thereby to provide wireless transmission of raw signals proportional to signal intensities detected while scanning a product code from said reader to said central receiving unit.

23. The reader of claim 22, and comprising one member of the group comprising a handle, to allow handheld use, and a mounting unit for mounting the unit on the body of a user to provide hands free use.

24. The reader of claim 22, wherein said interface comprises a wireless interface.

* * * * *